M. KARP.
SOLDERING MACHINE.
APPLICATION FILED APR. 2, 1912.
1,082,270.
Patented Dec. 23, 1913.
2 SHEETS—SHEET 1.
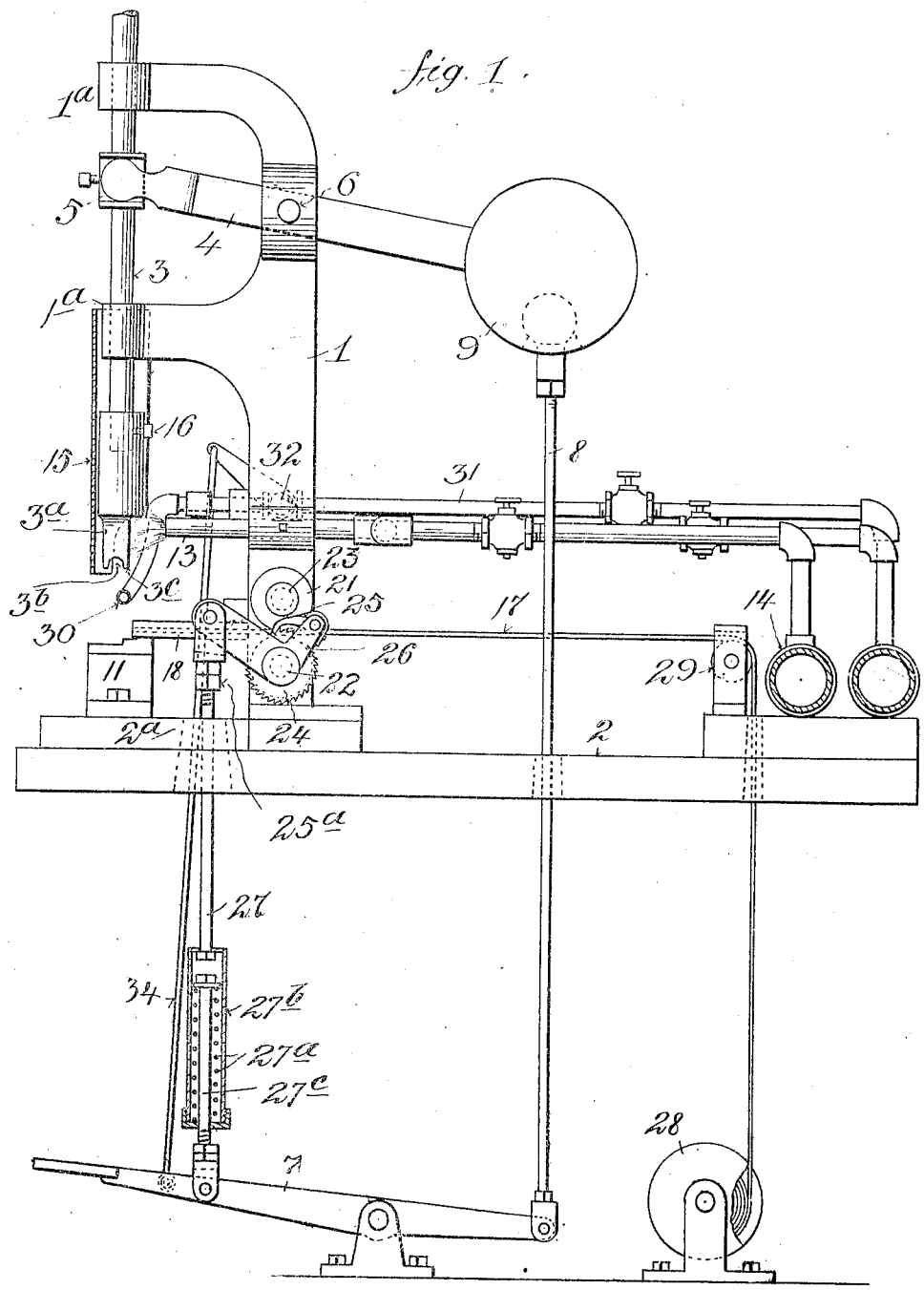
Witnesses:
Inventor
Morris Karp.
By his Attorney
T. F. Bourne

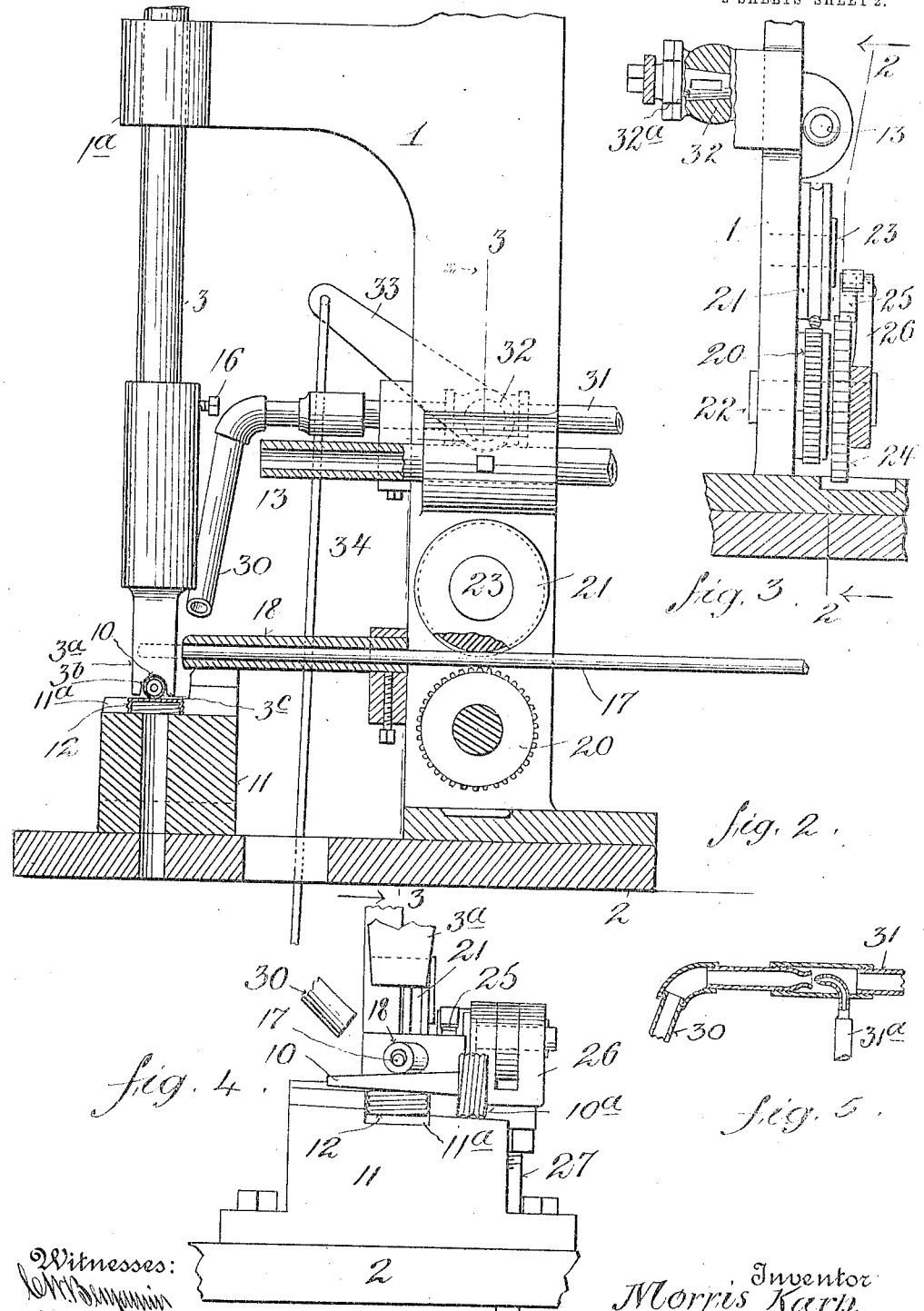

UNITED STATES PATENT OFFICE.

MORRIS KARP, OF PASSAIC, NEW JERSEY, ASSIGNOR TO PASSAIC METAL WARE COMPANY, OF PASSAIC, NEW JERSEY, A CORPORATION OF NEW JERSEY.

SOLDERING-MACHINE.

1,082,270.   Specification of Letters Patent.   Patented Dec. 23, 1913.

Application filed April 2, 1912. Serial No. 688,022.

*To all whom it may concern:*

Be it known that I, MORRIS KARP, a citizen of the United States, and resident of Passaic, in the county of Passaic and State of New Jersey, have invented certain new and useful Improvements in Soldering-Machines, of which the following is a specification.

The object of my invention is to provide simple and efficient means for expeditiously soldering different parts together, and is particularly adapted for soldering screw caps on sides of tubes or spouts.

Tubes or spouts for certain kinds of cans are frequently provided with screw caps soldered to the sides of the former, so that such caps may act as closures for cans or containers, and when unscrewed from the can or container the threaded cap at one end of the tube or spout may be screwed upon the can for attaching the former thereto. Such caps have frequently been soldered to the sides of spouts by hand operation which is more or less costly and inaccurate, and by means of my invention such soldering of the parts together may be carried out accurately and cheaply, although my invention is not limited to soldering such described parts together.

My invention comprises novel details of improvement and combinations of parts that will be more fully hereinafter set forth and then pointed out in the claims.

Reference is to be had to the accompanying drawings forming part hereof, wherein, Figure 1 is a partly sectional side elevation of a soldering machine embodying my invention; Fig. 2 is an enlarged side view of a portion of the machine, partly in section on the plane of the line 2, 2, in Fig. 3; Fig. 3 is an edge view, partly in section substantially on the line 3, 3, in Fig. 2; Fig. 4 is a detail front view looking from the left in Fig. 2; Fig. 5 is a detail section of modified means for spraying water upon the soldered parts.

Similar numerals of reference indicate corresponding parts in the several views.

The numeral 1 indicates a suitable frame or standard, which may be supported upon a table or the like 2, said frame being provided with suitable guides 1ª, for a plunger 3, which may be raised and lowered by a lever 4 movably connected with said plunger at 5 and pivotally supported at 6 upon frame 1. Lever 4 may be operated by a treadle 7 connected by rod 8 with said lever.

9 indicates a counter-weight on lever 4. Plunger 3 is provided with a soldering iron or the like 3ª shown having a recess 3ᵇ at its lower end adapted to receive the article to be soldered such as a tube or spout 10. Soldering iron 3ª is shown secured to plunger 3 by screw 16. Beneath soldering iron 3ª is a rest 11, shown provided with a recess 11ª to receive the part, such as a cap 12, to be soldered to the side of tube, spout or nozzle 10. Spout 10 is shown provided with an ordinary screw cap 10ª at one end. Suitable means are provided for heating soldering iron 3ª. For this purpose I have shown a burner 13, in the nature of a Bunsen burner, shown connected with gas supply pipe 14. Burner 13 is shown located in such position (Fig. 1) that when soldering iron 3ª is raised the flame from the burner will be projected against the soldering iron.

At 15 is a shield opposed to the flame and carried by plunger 3 in any suitable manner. The solder 17, shown in the form of solder-wire, may be guided through a tube or other suitable means 18, shown carried by frame 1, so as to be projected over tube or spout 10 between the latter and soldering iron 3ª. Means are provided for feeding solder wire step by step over the articles to be soldered, and the lower edge 3ᶜ of the soldering iron is adapted to cut or melt off the end of the solder extending from guide 18 as the soldering iron descends. The means shown for feeding the solder wire forwardly, step by step, comprise opposed wheels receiving the solder wire between them. I have shown a toothed wheel 20 and an opposed grooved wheel 21 mounted respectively to rotate upon studs 22, 23, carried by frame 1, between which wheels the solder wire 17 is passed.

At 24 is a ratchet wheel connected with wheel 20 and operated by a spring pressed pawl 25, shown carried by one arm of a bell crank lever 26 journaled upon or secured to stud 22, and connected at its other arm by a rod 27 and spring 27ª with treadle 7, whereby when said treadle is depressed the solder wire 17 will be projected forwardly the required distance. Solder wire 17 may pass to guide 18 from a reel 28 and be guided over a pulley 29 upon table 2. To permit further depression of treadle 7, after the solder wire has been fed, a spring 27ᵃ is provided. I have shown spring 27ᵃ inclosed in a tube or casing 27ᵇ within which headed rod 27ᶜ slides, spring 27ᵃ being interposed between the bottom of tube 27ᵇ and the head of rod 27ᶜ, the latter being pivotally connected with treadle 7. Nut 25ᵃ may engage the stop or plate 2ᵃ when the treadle is depressed to limit the rotation of ratchet wheel 24 and thereby to regulate the amount of feed of the solder wire, for which purpose said nut may be adjusted along rod 27. I have also provided means for cooling the soldered parts after the solder has been applied thereto. This may be accomplished by blowing air or spraying water against the soldered parts, such as against the soldered tube or spout 10 and its cap 12. For this purpose I preferably provide a delivery nozzle 30, shown connected with a supply pipe 31, and having an air controlling valve 32 whose stem 32ᵃ is connected by an arm 33 with rod 34, said rod being connected with treadle 7. Air under pressure may be supplied to pipe 31 and when the treadle is depressed and the valve closed the air flowing from nozzle 30 is cut off, and when the treadle is released or raised the air flows directly from nozzle 30 upon the soldered parts.

In Fig. 5 I have shown means for cooling the soldered parts by aspirated water. For this purpose a jet or nozzle 31ᵃ communicating with a water supply is located within the piping 31, and thus as air is blown through pipe 31 it will draw water from nozzle 31ᵃ and cause cooling spray to be directed upon the soldered parts.

In the operation of my machine the parts to be soldered are placed together upon the seat or rest 11, as for instance, cap 12 is placed upon seat or rest 11 and the spout or nozzle 10 is placed over the cap (Fig. 4) and then treadle 7 is depressed. The flow of air or aspirated water to nozzle 30 is then cut off, the solder wire projected over the articles to be soldered, and the nut 25ᵃ meeting the stop 2ᵃ limits the feeding of the solder while treadle 7 may continue to be depressed by reason of the compression of spring 27ᵃ, and lever 4 is rocked to depress plunger 3 and the heated soldering iron 3ᵃ. The soldering iron cuts or melts off the portion of the solder 17 projecting from guide 18 and forces it down upon the articles, and the parts are held in such position until the heated soldering iron properly melts the solder to secure the parts together. The treadle is then released, the soldering iron is raised, pawl 25 moves back and valve 32 opens, thereupon air or aspirated water is blown or ejected from nozzle 30 against the soldered parts to cool the same. Such parts are then removed, and the operations may be repeated as desired.

By means of my invention it will be apparent that the operation of soldering the parts together, such as spouts to the caps, can be accomplished with expedition and accuracy, without wasting solder, and substantially the proper amount of solder may be applied at each operation.

While I have shown a ratchet and pawl for feeding the soldered wire, it will be understood that the feeding wheels may operate by frictional contact against the solder wire or that the solder wire may be fed in any well known manner, and that any desired parts may be soldered together by suitably arraying the mechanism described to receive and act upon such parts.

My invention is not limited to the details of construction and arrangements of parts set forth, as the same may be varied, within the scope of the appended claims, without departing from the spirit of the invention.

Having now described my invention what I claim is:—

1. In a soldering machine, the combination of a rest for an article to be soldered, a soldering iron above said rest, means out of the path of said iron to project solder over such article below the soldering iron, means to heat the soldering iron, means to apply the soldering iron to the solder upon such article, and means to cause the soldering iron as it approaches said article to cut off a piece of the solder while over said article and to deposit such piece of solder upon said article and melt it thereon.

2. In a soldering machine the combination of a rest for an article to be soldered, means to project cold solder over such article, a soldering iron traveling in a path at one side of said means, means to heat the soldering iron, and means to apply the soldering iron to the cold solder that is over such article, the soldering iron being provided with solder cutting means at its lower portion on the side toward the solder projecting means, to remove pieces of cold solder and hold them upon the articles beneath such solder as the soldering iron approaches said articles to melt the pieces on the latter.

3. In a soldering machine the combination of a soldering iron, having means to cut off pieces of solder, means to heat the soldering iron, means to project cold solder over an article to be soldered, means to apply the soldering iron to said solder while the latter projects over said article, a nozzle extending toward the soldered article, and means for blowing cooling fluid through said nozzle upon the soldered article.

4. In a soldering machine the combination of a rest, a soldering iron movable above the rest and having means to cut off pieces of solder over an article, means to heat the soldering iron, means to project cold solder over an article upon the rest beneath said iron, means to apply the soldering iron to the solder while the latter is over said article, a nozzle adjacent to said rest at one side of the path of said iron, and means for blowing cooling fluid through the nozzle upon the soldered article on the rest.

5. In a soldering machine, the combination of means for guiding cold solder wire over an article to be soldered, means to feed the solder wire step by step over said article, a soldering iron, having means to cut off pieces of solder over the article, means to move the soldering iron toward and from the article to engage the portion of the solder wire that is over said article, and means to heat the soldering iron.

6. In a soldering machine, the combination of a rest, a guide for solder-wire adjacent the rest, means to feed the solder-wire step by step over an article on the rest, a soldering iron above the rest, means to move the soldering iron toward and from the rest, the soldering iron being provided with means on its lower portion adjacent said guide to cut off pieces of solder-wire projected from the guide, and means to heat the soldering iron when elevated above the rest.

7. In a soldering machine, the combination of a rest, a guide for solder-wire adjacent the rest, means to feed the solder-wire step by step over an article on the rest, a soldering iron above the rest, having means to cut off pieces of solder over the article, means to move the soldering iron toward and from the rest, means to heat the soldering iron, a nozzle terminating adjacent the rest, and means for directing cooling fluid through said nozzle against a soldered article on the rest.

8. In a soldering machine the combination of a rest for an article to be soldered, means to feed solder over an article on the rest, a soldering iron, a treadle connected with the soldering iron to move the latter toward and from the rest to engage the solder thereover, a nozzle terminating adjacent the rest, a fluid supply pipe connected with the nozzle, a valve for said pipe, means connecting the treadle with said valve to operate the valve to cut off the flow of fluid from the nozzle when the treadle is operated to cause the soldering iron to approach the rest and to allow the flow of fluid from said nozzle when the soldering iron recedes from the rest.

9. In a soldering machine the combination of a rest for an article to be soldered, a treadle, means operated by the treadle to feed solder wire step by step over an article on the rest, a soldering iron, means connecting the treadle with the soldering iron to move the latter toward and from the rest to engage the solder thereover, a nozzle terminating adjacent to the rest, an air supply pipe connected with the nozzle, a valve for said pipe, and means connecting the treadle and valve to operate the valve to cut off the flow of air from the nozzle when the soldering iron approaches the rest and to allow the flow of air from said nozzle when the soldering iron recedes from the rest.

Signed at Passaic, in the county of Passaic, and State of New Jersey, this 21st day of March, A. D. 1912.

MORRIS KARP.

Witnesses:
WM. F. GASTON,
FRED W. GASTON